United States Patent [19]
Koike et al.

[11] Patent Number: 5,528,709
[45] Date of Patent: Jun. 18, 1996

[54] CORNER SUPPLY TYPE PLANE LIGHT SOURCE DEVICE

[75] Inventors: Yasuhiro Koike, Yokohama; Kayoko Watai, Hasuda, both of Japan

[73] Assignee: Enplas Corporation, Kawaguchi, Japan

[21] Appl. No.: 441,963

[22] Filed: May 16, 1995

[51] Int. Cl.⁶ .............................. G02B 6/12; G02B 6/10; F21V 7/04
[52] U.S. Cl. .................. 385/14; 385/88; 385/89; 385/39; 385/129; 385/130; 385/901; 362/31
[58] Field of Search .................. 385/14, 15, 27, 385/30, 31, 38, 39, 88, 89, 124, 129, 130, 131, 147, 901; 362/31, 32

[56] References Cited

U.S. PATENT DOCUMENTS

| | | | |
|---|---|---|---|
| 4,053,206 | 10/1977 | Yevick | 385/901 X |
| 4,151,582 | 4/1979 | Grunberger | 362/31 |
| 4,172,631 | 10/1979 | Yevick | 385/31 |
| 4,761,047 | 8/1988 | Mori | 385/901 X |
| 4,961,617 | 10/1990 | Shahidi et al. | 385/901 X |
| 4,989,933 | 2/1991 | Duguay | 385/31 X |
| 5,050,946 | 9/1991 | Hathaway et al. | 385/33 |
| 5,117,472 | 5/1992 | Blyler, Jr. et al. | 385/28 |
| 5,165,187 | 11/1992 | Shahidi–Hamedani et al. | 362/32 |
| 5,400,224 | 3/1995 | DuNah et al. | 362/31 |
| 5,438,484 | 8/1995 | Kanda et al. | 362/31 |

FOREIGN PATENT DOCUMENTS

| | | | |
|---|---|---|---|
| 06324330 | 11/1994 | Japan | 385/14 X |
| 07036037 | 2/1995 | Japan | 385/14 X |

OTHER PUBLICATIONS

Front Page of WO 93/06509, including Abstract. (Apr./93).

*Primary Examiner*—Brian Healy
*Attorney, Agent, or Firm*—Staas & Halsey

[57] ABSTRACT

A corner supply type plane light source device having a simple structure and capable of forming a uniform luminescent part with a small power consumption is disclosed. The corner supply type plane light source device comprises a flat-plate light-scattering light guide 1, diffusion reflective sheets 2, 4, and LEDs 3 disposed at corners. The light-scattering light guide 1 is composed of a material provided with a uniform scattering power, and the effective scattering irradiation parameter E and the correlation distance a satisfy the conditions of $9 \leq E[cm^{-1}] \leq 100$ and $0.06 \leq a[\mu m] \leq 35$. Turning on the LEDs 3, light is supplied from each corner. The LED radiation light having directivity immediately undergoes the scattering in the light-scattering light guide 1 and the propagation direction is expanded in the lateral and vertical directions, and also undergoes the internal reflection on the bottom 12 and sides 13, and diffusion reflection by the diffusion reflective sheets 2, 4. As a result, the light propagates throughout the entire light-scattering light guide 1. The light surpassing the critical conditions on the light exit surface 11 through this process is emitted from the light exit surface 11 to provide a light flux F. (Representative drawing) FIG. 4

6 Claims, 4 Drawing Sheets

CORNER SUPPLY TYPE PLANE LIGHT SOURCE DEVICE

BACKGROUND OF ART

1. Technical Field

The present invention relates to a corner supply type plane light source device making use of optical means having both light guide function and scattering function in an internal volume region (hereinafter called light-scattering light guide). The plane light source device of the invention is applied to backlight source means of display device such as liquid crystal display.

2. Description of the Related Art

In a known plane light source device of a thin panel type used in backlight source means of various display devices including liquid crystal display, a light guide of straight tube type (typically, a fluorescent lamp) is disposed at a position opposite to the side end face of a plane light guide, and light is supplied to the light guide from the straight tube light source. The light introduced into the light guide is converted in propagation direction, and is emitted from a light exit surface (luminescent surface). In such plane light source device, to form a luminescent surface of a relatively wide area on the surface of the light guide, light supply means of a large size must be disposed at least in one direction. This is not, however, an advantageous condition for saving power in the plane light source device or simplifying the structure.

On other hand, in the plane light source device having a flat light guide, a technique for disposing light supply means at a corner or corners of the light guide has been proposed, but it is difficult to distribute the light entering from a corner of the light guide uniformly in the entire light guide, and practical plane light source device has not been realized yet. A light-emitting diode (LED) of high luminance and small size has been developed, and its size is considered to be suited to be disposed in the corner of the light guide. However, when an LED between a type with strong directivity in radiation light is used for enhancing the efficiency of light coupling between the LED and the light guide, a plane light source device high in uniformity of brightness is not realized in the constitution of disposing at the corner of the light source.

To avoid this problem, when high luminance LEDs are used as light supply means of plane light source device, a light diffusion plate is combined by arranging the LEDs in a two-dimensional array. Therefore, if the light supply means of high luminance LEDs is used, the entire structure including the wiring is complicated, and it is difficult to save power and simplify the structure.

Moreover, in the conventional plane light source device for obtaining an illumination light by converting the propagation direction of incident light by using light scattering in the light-scattering light guide, a considerable portion of the light entering in the light-scattering medium is scattered backward, and tends to return to the light source side without being guided sufficiently in the scattering medium. Such return light not only causes light loss, but also raises locally the luminance in the portion near the light supply source and generally lowers the luminance in the portion remote from the light supply source.

OBJECT AND SUMMARY OF THE INVENTION

It is hence an object of the invention to present a corner supply type plane light source device capable of forming a luminescent surface high uniformity with a small power consumption, having a simple structure.

The plane light source device of the invention comprises a light-scattering light guide of a flat plate shape having a volume region possessing a uniform scattering power, and light supply means for supplying light from a corner or corners of the light-scattering light guide. The scattering characteristic of the light-scattering light guide is expressed by the value of the effective scattering irradiation parameter $E[cm^{-1}]$, and the value of the correlation distance $a[\mu m]$ in the correlation function $\gamma(r)$ of the refractive index non-uniform structure for producing light scattering power, said function being approximated by $\gamma(r)=\exp[-r/a]$ (where r is the distance between two points in the light-scattering light guide). The value of the effective scattering irradiation parameter $E[cm^{-1}]$ of the light-scattering light guide used in the invention is in a range of $9 \leq E \leq 100$. The value of the correlation distance $a[\mu m]$ is in a range of $0.06 \leq a \leq 35$. As the light source element to be disposed in a corner of the light-scattering light guide, a light-emitting diode may be used.

The scattering irradiation parameter E and the correlation distance a used in defining the scattering characteristic of the light-scattering light guide in the invention may be explained as follows by quoting the theory proposed by Debye.

When light with intensity $I_0$ passes through a medium (light-scattering light guide) by $y$(cm), and the intensity is attenuated to I by scattering at this time, the effective scattering irradiation parameter E is defined in the following formula (1) or (2).

$$E[cm^{-1}]=-[ln(I/I_0)]/y \qquad (1)$$

$$E[cm^{-1}]=-(1/I)dI/dY \qquad (2)$$

These formulas (1) and (2) are respectively so-called integral type and differential type expressions, and are equivalent in physical meaning. This term E is also known as turbidity.

On the other hand, the scattered light intensity in the case of occurrence of light scattering due to uniform structure distributed in the medium is expressed in formula (3) in an ordinary case ($V_v$ scatter) when the majority of exit light is vertical polarization from the incident light of vertical polarization.

$$Vv = [(4<\eta^2>\pi^3)/\lambda_0^4]\int_0^\infty C\gamma(r)dr \qquad (3)$$

where $$C = [r^2 \sin(\nu sr)]/\nu sr \qquad (4)$$

In the case of incidence of natural light, considering Hh scatter, it is known that the following formula multiplying the right side of formula (3) by $(1+\cos^2\phi)/2$ may be regarded as the scattered light intensity.

$$I_{vh}=V_v(1+\cos^2\phi)/2 \qquad (5)$$

where $\lambda_0$ is the wavelength of incident light, $\upsilon=(2\pi n)/\lambda_0$, $s=2\sin(\phi/2)$. Moreover, n is the refractive index of the medium, $\phi$ is the scattering angle, and $<\eta^2>$ is the dielectric constant fluctuation square mean in the medium (hereinafter assuming $<\eta^2>=\tau$, $\tau$ is used instead). Herein, $\gamma(r)$ is a function called a correlation function. This correlation function $\gamma(r)$ is expressed in formula (6).

$$\gamma(r)=\exp(-r/a) \qquad (6)$$

According to the theory of Debye, when the refractive index non-uniform structure of the medium is divided and dispersed into phase A and phase B with an interface, the following formulas (7) and (8) are established among the correlation function $\gamma(r)$, correlation distance a, and dielectric constant fluctuation square mean $\tau$.

$$a[cm]=(4V/S)\phi_A\phi_B \qquad (7)$$

$$\tau=\phi_A\phi_B(n_A{}^2-n_B{}^2)^2 \qquad (8)$$

When the non-uniform structure of refractive index is regarded to be composed of a spherical interface of radius R, the correlation distance a is given in the following formula.

$$a[cm]=(4/3)R(1-\phi_A) \qquad (9)$$

Using formula (6) about the correlation function $\gamma(r)$, the effective scattering irradiation parameter E by the incidence of natural light in the medium is calculated in formula (5) is calculated, and the following result is obtained.

$$E=[(32a^3\tau\pi^4)/\lambda_0{}^4]\cdot f(b) \qquad (10)$$

where $$f(b)=[\{(b+2)^2/b^2(b+1)\}-\{2(b+2)/b^3\}\cdot ln(b+1)] \qquad (11)$$

$$b=4v^2a^2 \qquad (12)$$

It is hence known that the scattered light intensity and its angle dependence can be controlled by varying the correlation distance a and the dielectric constant fluctuation square mean $\tau$, and that there is a close relationship between the correlation distance a and the dielectric constant fluctuation square mean $\tau$ and effective scattering irradiation parameter E.

Figure 1:
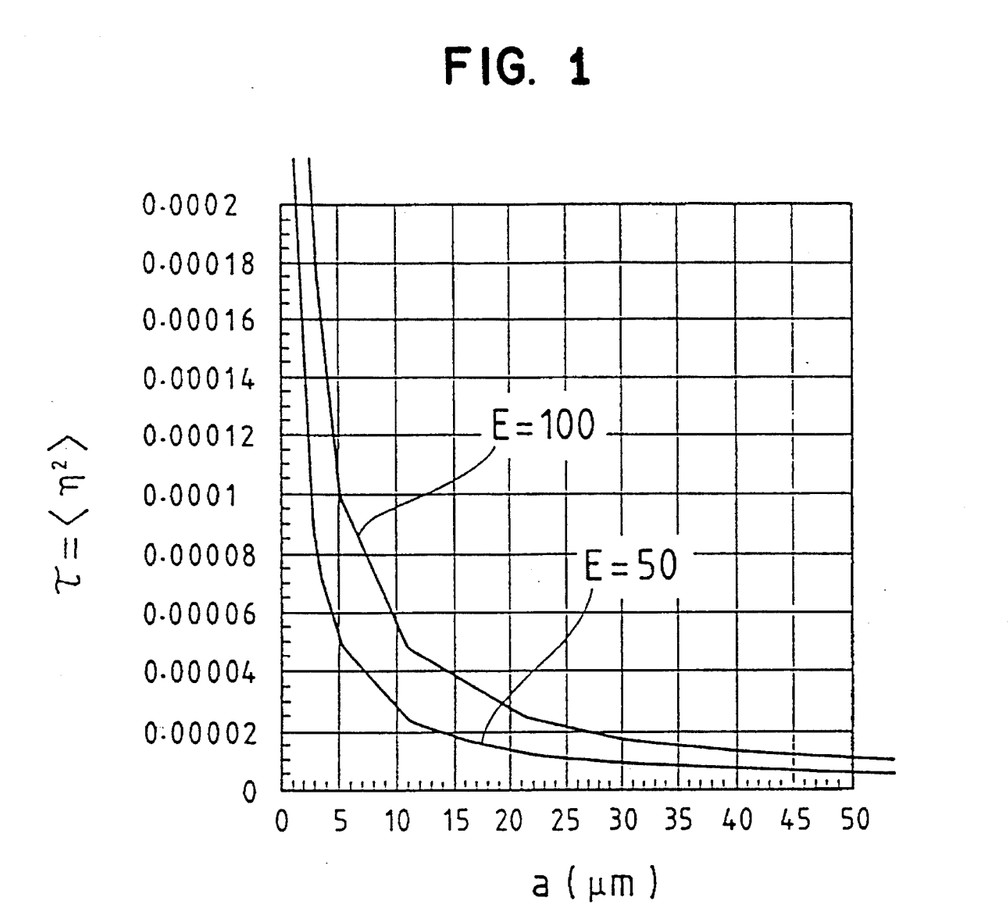
FIG. 1 shows curves expressing the conditions for rendering constant the effective scattering irradiation parameter E, plotting the correlation distance a on the axis of abscissas and the dielectric constant fluctuation square mean τ on the axis of ordinates, in the cases of $E=50[cm^{-1}]$ and $E=100 [cm^{-1}]$.

The graph in FIG. 1 shows curves expressing the conditions for making constant the effective scattering irradiation parameter E, in the case of $E=50[cm^{-1}]$ and $E=100[cm^{-1}]$. The axis of abscissas of the graph shows the correlation distance a, and the axis of ordinates denotes the dielectric constant fluctuation square mean $\tau$.

Generally, a large E gives a strong scattering power, and a small E gives a weak scattering power (relatively transparent state). A completely scatter-free state (transparent light guide) is expressed as E=0.

Therefore, according to a general tendency, when a uniform luminescent surface of a large size is desired, a light-scattering light guide of a small value of effective scattering irradiation parameter E is preferably used. To the contrary, to obtain a luminescent surface of high luminance in a small size, a light-scattering light guide with a large value of effective scattering irradiation parameter E is suited.

The numerical requirement of $9 \leq E \leq 100$ of the effective scattering irradiation parameter $E[cm^{-1}]$ assigned in the invention is determined practically according to this concept, assuming a plane light source device of ordinary or slightly small size (about several cm to 10 and several cm).

On the other hand, the correlation distance a is a quantity closely related with the direction characteristic of the scattered light in individual scattering inside the light-scattering light guide. That is, as estimated from formulas (3) to (5), light scattering inside the light-scattering light guide generally tends to scatter forward, but the intensity of forward scattering varies with the correlation distance a.

Figure 2:
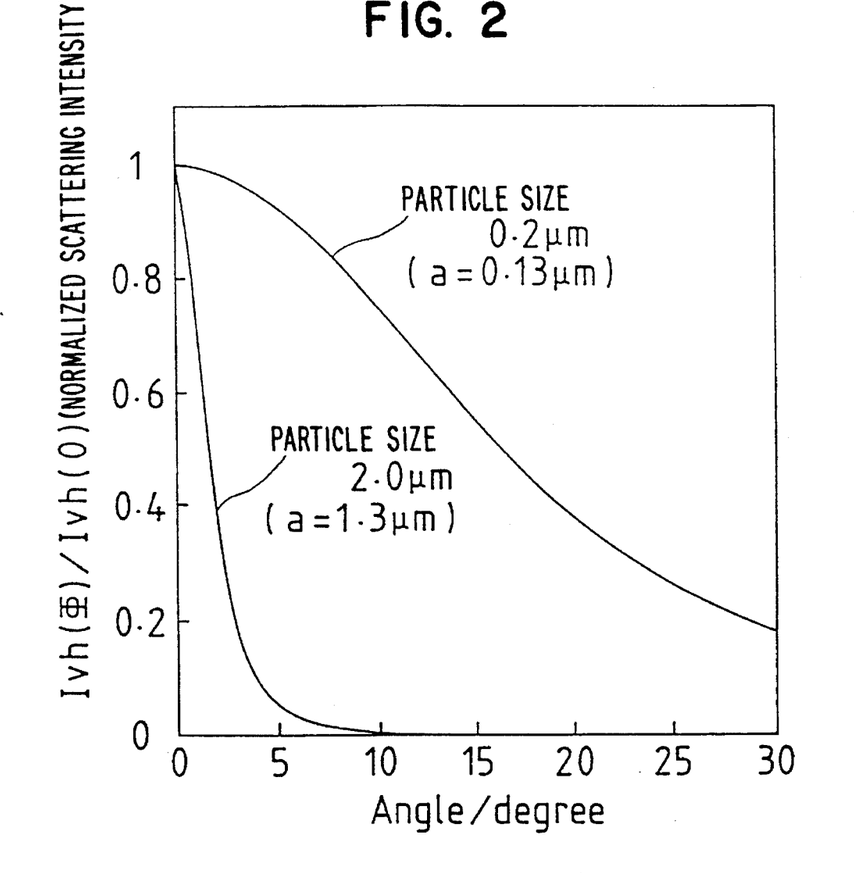

FIG. 2 is a graph showing two values of a. In the diagram, the axis of abscissas expresses the scattering angle $\phi$ (assuming the direction of the incident ray to be $\phi=0°$), and the axis of ordinates represents the normalized scattered light intensity assuming natural light, that is, the value of formula (5) normalized at $\phi=0°$, $V_{vn}(\phi)/V_{vn}(0)$.

As shown in the diagram, in the case of a=0.13 μm, that is, in the case of grain size converted value of 2R=0.2 pm according to formula (9), a graph expressing a moderate decreasing function about $\phi$ is obtained. On the other hand, in the case of a=1.3 μm, that is, in the case of grain size converted value of 2R=2.0 μm according to formula (9), a graph expressing a suddenly decreasing function in a region of small value of $\phi$ is obtained.

In this way, the scattering caused by non-uniform refractive index structure in the light-scattering light guide basically has the nature of forward scatter, but as the value of the correlation distance a becomes smaller, the character of forward scatter becomes weaker, and the range of scatter angle in individual scatter processes tends to expand.

This discussion is established when taking note of the individual scatter by the non-uniform refractive index structure distributing in side the light-scattering light guide. To evaluate the direction characteristic of the light actually emitted from the light-scattering light guide, it is necessary to consider also the phenomenon of total reflection of light entering the interface of the light-scattering light guide and external field (air layer) from the inner side, and the transmissivity of the interface (the escape rate from the light-scattering light guide to the external field).

According to the fundamental theory of optics, when the incident angle of the light entering the interface with the external field from the inner side of the medium (light-scattering light guide) exceeds the critical angle $\alpha_c$ determined by the refractive index of the medium inside and outside the light-scattering light guide, emission (escape) into the external field (the air layer in this case) does not occur. In PMMA (refractive index 1.492) which is a typical material used in the invention, $\alpha_c$ is 42°. Herein, the incident angle is measured so that the normal direction erected from inside to the interface, that is, the light exit surface (luminescent surface) is 0°.

As shown later, the refractive index of ordinary resin material preferably used as matrix material of the light-scattering light guide in the invention is in a range of 1.4 to 1.7. The range of corresponding $\alpha_c$ is 36.0° to 45.6°.

As mentioned above, since the scattering inside the light-scattering light guide has the tendency of forward scatter, in the case of the light incident surface taken at a side of the plate-form light-scattering light guide, it seems rare that the primary scattering light entering from the light incident surface and encountering a non-uniform structure immediately satisfies the critical angle condition. Therefore, the light exit from the light exit surface (luminescent surface) seems to be closely related with the phenomenon of the light satisfying the critical angle condition and leaving outside through the multiple scatter processes inside the light-scattering light guide or reflection processes at the interface of the back side of the light-scattering light guide or at a reflection member.

Thus as far as the light satisfying the critical angle condition is concerned, the forward scatter which is an attribute of individual scattering phenomena should be weakened substantially and there should be a considerable expanse in the light propagation direction distribution. As a result, the direction characteristic of the light emitted from the light-scattering light guide strongly depends on the angle dependence of transmissivity (interface transmissivity or escape rate) at the light exit surface (luminescent surface) for the light satisfying the critical angle condition.

Generally, the interface transmissivity of the light is extremely low when entering the medium interface at an incident angle barely satisfying the critical angle condition. For example, in the case of interface of acrylic resin and air, the interface transmissivity of P polarized component is about 40%, and the interface transmissivity of S polarized component is about 20%. As the incident angle becomes smaller and the difference from the critical angle increases, the light transmissivity rises sharply. When the incident angle is smaller than the critical angle by 5° to 10° or more, the value of interface transmissivity is nearly constant. For example, in the case of interface of acrylic resin and air, it is more than 90% in P polarized component, and more than 85% in S polarized component.

Hence, in the case of acrylic resin, the light of which incident angle from the inner side of the light-scattering light guide to the light exit surface (luminescent surface) is about 35° to 40° seems to contribute most to the formation of the luminescent surface. Considering the Snell's rule about refraction, when the light take-out surface is the interface of acrylic resin and air, the light entering the light exit surface from the inner side of the light-scattering light guide at an incident angle of about 35° to 40° is emitted to the direction in a range of plus or minus several degrees of 65° to the normal erected from the air side to the light exit surface.

When other material than acrylic resin is used in the matrix for composing the light-scattering light guide, the actual range of refractive index of material is about 1.4 to 1.7, and considering a deviation of several degrees in the above angle, the same discussion is established.

This has been the outline of light behavior in the light-scattering light guide. What should be noted here is that the forward scatter property in individual scattering processes is diluted when the value of the correlation distance a becomes very small. That is, in the condition of very small value of the correlation distance a, scattered light in a wide range including backward scatter is generated by primary scatter only. As a result, the light propagation direction in the light-scattering light guide becomes bidirectional, and return light is formed easily.

In the invention, the light-scattering light guide satisfying the condition so as not to cause such phenomenon manifestly is used. A practical lower limit of the correlation distance a satisfying this condition is about 0.06 μm.

On the other hand, as known from FIG. 1, the greater the correlation distance a, the harder it tends to be to increase the effective scattering irradiation parameter E. In the invention, taking this condition also into consideration, a practical range of 0.06 μm to 35 μm is selected as the value of the correlation distance a of the light-scattering light guide for composing the light-scattering light guide. When dispersing particles differing in refractive index in order to provide the light-scattering light guide with scattering power, the range of the particle size corresponding to this condition is 0.1 μm to 54 μm from formula (9).

Figure 3:
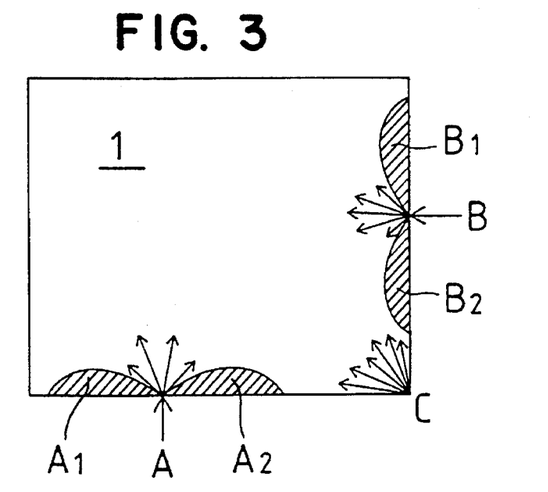
FIG. 3 is a diagram explaining the expanse of light propagation direction right after incidence in the case of supply of light from the side of the light-scattering light guide in a flat plate form having a uniform scattering power.

Referring now to FIG. 3, light supply is discussed in the case of supply of light from the side portion of the light-scattering light guide in a flat plate form having uniform scattering power in such condition. FIG. 3 shows the expanding of the light propagation direction right after incident in the case of light supply from the side portion of the light-scattering light guide in a flat plate form having uniform light scattering power.

In the diagram, reference numeral 1 denotes a quadrangular light-scattering light guide. Supposing the light having a directivity in the arrow direction (for example, LED radiation light) is supplied from vertical and lateral sides A, B and corner C, the behavior of the light is considered. In the light-scattering light guide 1 defined in the light scattering characteristic in the above condition, regardless of incident positions A, B, C, the light is transmitted to the entire light-scattering light guide 1 by the scattering action from the position right after incidence, face and back reflections and other actions, so that nearly the entire surface is a luminescent surface.

However, distribution of light propagation direction right after incident into the light-scattering light guide 1 is generally in a sector profile, and therefore the light entering from the incident positions A, B of straight sides is hardly transmitted to the regions indicated by $A_1$, $A_2$, $B_1$, $B_2$ near the incident positions. Hence, the luminescence tends to be insufficient in $A_1$, $A_2$, $B_1$, $B_2$.

By contrast, the light entering the light-scattering light guide 1 from the corner position C covers the entire region near the incident position by the expanse of light propagation direction right after incident. Therefore, the luminescence shortage portions as indicated by $A_1$, $A_2$, $B_1$, $B_2$ are hardly formed.

The invention realizes a corner supply type light source device having a uniform luminescent surface by using the light-scattering light guide 1 in such condition.

BRIEF DESCRIPTION OF DRAWINGS

FIG. 2 is a graph explaining the changes of tendency of forward scatter property of light-scattering light guide for composing the light-scattering light guide in relation to correlation distance a.

DETAILED DESCRIPTION OF PREFERRED EMBODIMENTS

Figure 4A:
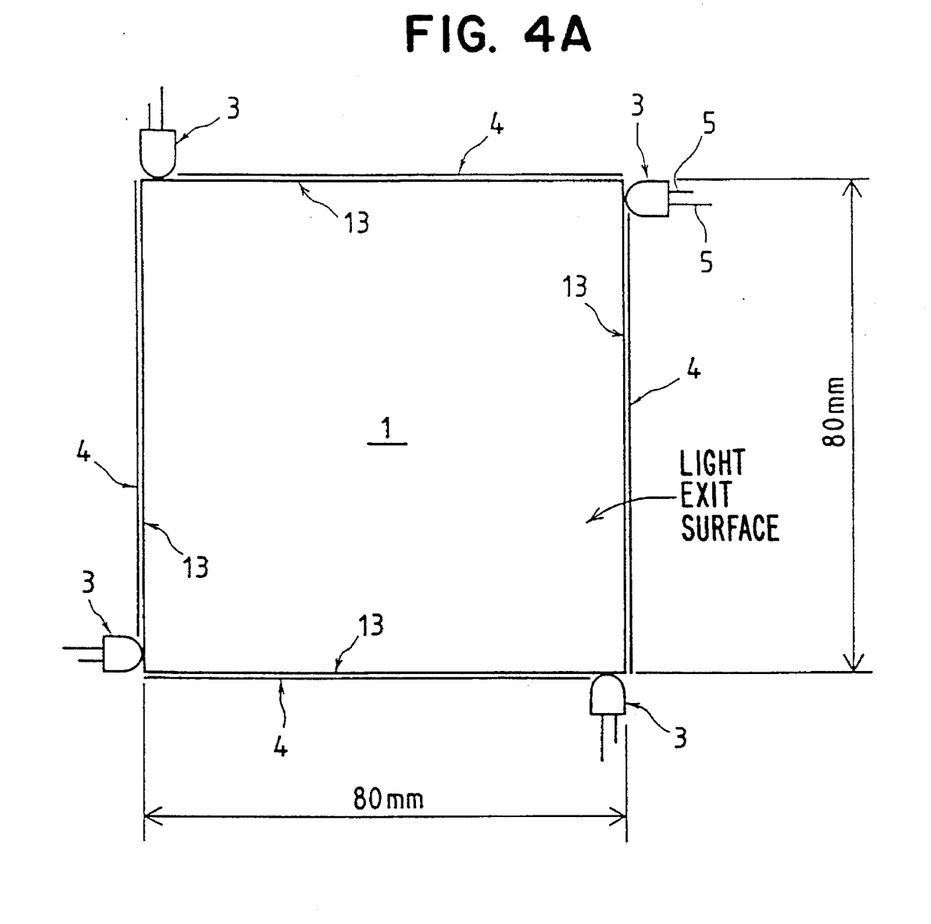
FIGS. 4(A) and (B) are diagrams explaining a schematic structure of an embodiment of the invention, in a top view FIG. 4(A) and in a sectional view FIG. 4(B).
Figure 4B:
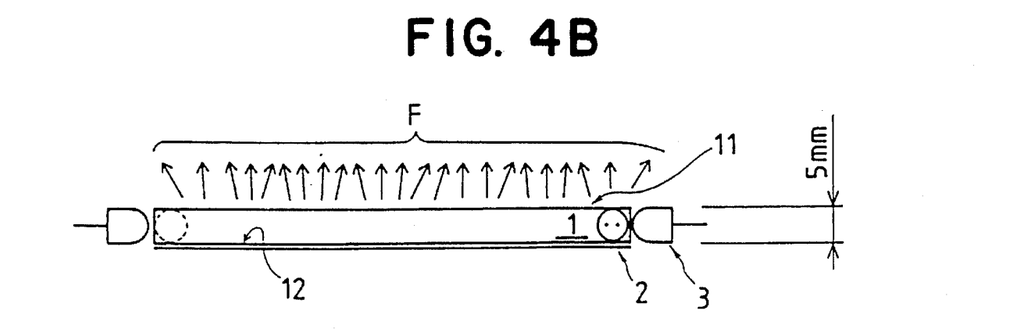

Referring to FIG. 4, a schematic structure of an embodiment of the invention is shown in a top view in FIG. 4(A) and in a sectional view in FIG. 4(B). A corner supply type plane light source device comprises a quadrangular flat-plate light-scattering light guide 1, a diffusion reflective sheet 2 disposed at the bottom side of the light-scattering light guide 1, LEDs 3 disposed at four corners, and a diffusion reflective sheet 4 provided at the side part.

The light-scattering light guide 1 is produced by dispersing a silicone resin material (TOSPEARL 120; Toshiba Silicone Co., Ltd., refractive index=1.4345) having a particle size of 2.0 μm uniformly at a rate of 1.0 wt. % in polymethyl methacrylate (PMMA, refractive index 1.492). Using the relation discussed above, the effective scattering irradiation parameter E and correlation distance a of this material are calculated, and $E[cm^{-1}]=91.00$ and $a=1.3$ μm are obtained. These values give a preferred example. Generally, materials satisfying $9 \leq E[cm^{-1}] \leq 100$ and $0.06 \leq a [\mu m] \leq 35$ simultaneously can be used. Such light-scattering light guide 1 may be manufactured lay employing a forming technology of resin materials (manufacturing examples are given later).

The size of the light-scattering light guide 1 is selected so as to coincide nearly with the size of the luminescent part necessary for the plane light source device. The size of 80 mm×80 mm×5 mm shown in FIG. 4 is an example.

As the LEDs 3 disposed so as to supply light from the corner to the light-scattering light guide 1, H-3000L of Stanley Electric Co. (red color, emission center wavelength $\lambda=660$ nm, 5 mm diameter) was used. Reference numeral 5 shows a lead wire connected to the terminal of each LED 3.

As indicated by reference numerals 11, 12 and arrow group F in the sectional view FIG. 4(B), one of the two planes having a relatively large area of the light-scattering light guide 1 is a light exit plane 11, and the other is a bottom 12. Along the light-scattering light guide bottom 12 and sides 13 (four sides having a relatively small area), diffusive reflective sheets 2, 4 are provided so as to prevent dissipation of light from the surfaces. At each corner, however, a light incident part not covered with diffusive reflective sheet 2 or 4 is formed. At reflective means for prevention of light dissipation, normal reflective means may be also used. In the plane light source device of the embodiment, it is not intended to provide exit light with directivity positively, and it is preferred to use reflective means of diffusive reflectivity.

Each LED 3 of the plane light source device is illuminated by feeding a current through a lead wire 5. Then, red light is radiated from each LED 3, and the LED light is supplied to the light-scattering light guide 1 from the light incident part (exposed part of the light-scattering light guide) at each corner. If the light radiated from the LED 3 has a strong directivity, it is immediately subjected to scattering action when entering the light-scattering light guide 1, and is expanded in the lateral and vertical directions. However, since the backward scatter component is hardly formed due to the condition of the correlation distance a of the light-scattering light guide 1, the directivity of propagating forward is sufficiently maintained.

As a result, the light propagates throughout the entire light-scattering light guide 1, also owing to other actions such as internal reflection on the bottom 12 and sides 13, and diffusion reflection by the diffusive reflective sheets 2, 4.

The light surpassing the critical conditions at the light exit surface 11 through the above process of scattering and guiding is emitted from the light exit surface 1. Expressing the entire exit light flux as F, as indicated by arrow group, the light flux F is a mixture of rays having varied directions. By the condition assigned to the correlation distance a, the return light is restricted, which hardly induces such phenomenon that only the vicinity of LED 3 is shining brightly or that the luminance is insufficient near the center of the light-scattering light guide 1 remote from each LED 3.

As drawn in FIG. 4(A), each LED 3 is disposed in a direction along each side 13. It is based on the concept of prevention of formation of luminescence shortage portion near the sides 13 by the relation of each LED 3 responsible for the region along each side 13 by the directive light.

The configuration of the LEDs 3 is not limited to this embodiment, and, for example, each LED 3 may be disposed toward the diagonal direction of a quadrilateral.

Figure 5A:
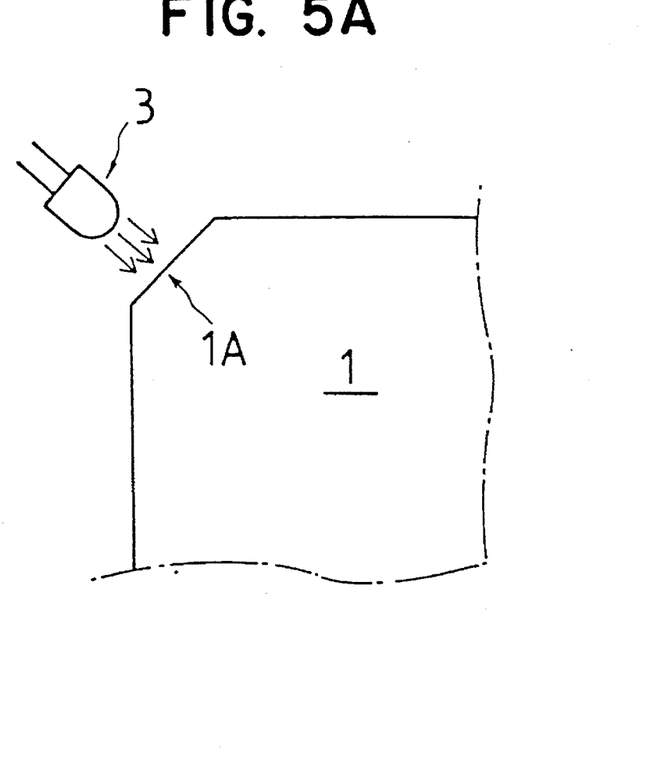
FIG. 5(A) and (B) show modified examples of the shape of the light incident surface, cutting the light incident surface in an oblique straight profile in FIG. 5(A) and cutting the light incident surface in a recess shape in FIG. 5(B).
Figure 5B:
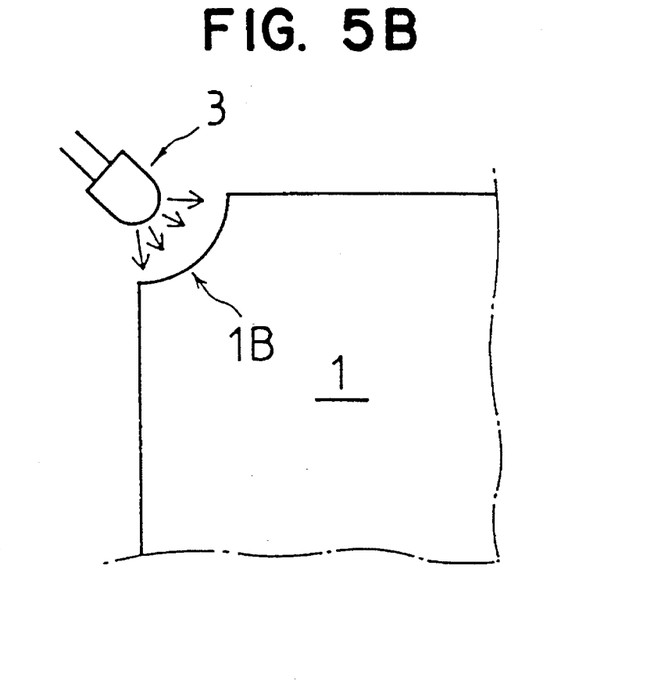

In such a case, as shown in FIG. 5(A), (B), it is preferred to decrease the reflection loss on the light incident surface by properly forming the corners of the light-scattering light guide 1. As shown in FIG. 5(A), the structure of forming the light incident surface in an oblique straight cut plane 1A is suited when the radiation light of the LED 3 has a strong directivity; and as shown in FIG. 5(B), the structure of forming the light incident surface in a recess shaped cut plane 1B is suited when using the LED 3 weak in directivity of radiation light.

From the viewpoint of maintaining the uniformity of brightness, it is preferred to supply light from all corners. However, to decrease the number of light source elements used, a light source may be disposed only in some of the corners.

As the light supply means, instead of the LED, for example, a small fluorescent lamp may be used. By disposing a light exit end of light guide member such as optical fiber bundle coupled to a proper light source at the corner of the light-scattering light guide, the light may be supplied to the light-scattering light guide.

The material for composing the light-scattering light guide used in the invention and the manufacturing method are described below.

As the material of the light-scattering light guide used in the invention, various materials based on polymer may be used. Typical examples of polymer are summarized in Table 1 and Table 2.

TABLE 1

| Category | Name of Polymer | Refractive Index |
|---|---|---|
| MA | 1. PMMA [polymethyl methacrylate] | 1.49 |
|  | 2. PEMA [polyethyl methacrylate] | 1.483 |
|  | 3. Poly(nPMA) [poly-n-propyl methacrylate] | 1.484 |
|  | 4. Poly(nBMA) [poly-n-butyl methacrylate] | 1.483 |
|  | 5. Poly(nHMA) [poly-n-hexyl methacrylate] | 1.481 |
|  | 6. Poly(iPMA) [polyisopropyl methacrylate] | 1.473 |
|  | 7. Poly(iBMA) [polyisobutyl methacrylate] | 1.477 |
|  | 8. Poly(tBMA) [poly-t-butyl methacrylate] | 1.463 |
|  | 9. PCHMA [polycyclohexyl methacrylate] | 1.507 |
| XMA | 10. PBzMA [polybenzyl methacrylate] | 1.568 |
|  | 11. PPhMA [polyphenyl methacrylate] | 1.57 |
|  | 12. Poly(1-PhEMA) [poly-1-phenylethyl methacrylate] | 1.543 |
|  | 13. Poly(2-PhEMA) [poly-2-phenylethyl methacrylate] | 1.559 |
|  | 14. PFFMA [polyfurfuryl methacrylate] | 1.538 |
| A | 15. PMA [polymethyl acrylate] | 1.4725 |
|  | 16. PEA [polyethyl acrylate] | 1.4685 |
|  | 17. Poly(nBA) [poly-n-butyl acrylate] | 1.4535 |
| XA | 18. PBzMA [polybenzyl acrylate] | 1.5584 |
|  | 19. Poly(2-ClEA) [poly-2-chloroethyl acrylate] | 1.52 |

TABLE 2

| Category | Name of Polymer | Refractive Index |
|---|---|---|
| AC | 20. PVAC [polyvinyl acetate] | 1.47 |
| XA | 21. PVB [Polyvinyl benzoate] | 1.578 |
|  | 22. PVAC [polyvinyl phenyl acetate] | 1.567 |
|  | 23. PVClAC [polyvinyl chloroacetate] | 1.512 |
| N | 24. PAN [polyacrylonitrile] | 1.52 |
|  | 25. Poly($\alpha$MAN) [poly-$\alpha$-methyl acrylonitrile] | 1.52 |
| $\alpha$-A | 26. PMA(2Cl) [(polymethyl-$\alpha$-chloroacrylate] | 1.5172 |
| St | 27. Poly(o-ClSt) [poly-o-chlorostyrene] | 1.6098 |
|  | 28. Poly(P-FSt) [poly-p-fluorostyrene] | 1.566 |
|  | 29. Poly(o, P-FSt) [poly-o-, p-diflurostyrene] | 1.475 |
|  | 30. Poly(p-iPSt) [poly-p-isopropyl styrene] | 1.554 |
|  | 31. PSt [polystyrene] | 1.59 |
| C | 32. PC [polycarbonate] | 1.59 |

The light-scattering light guide based on such polymer material is manufactured in the following manufacturing methods.

One method is to make use of the forming process including a step of kneading two or more types of polymers.

According to this method, two or more types of polymer material mutually differing in the refractive index are prepared. The polymer materials are available, for example, in pellets. The prepared polymer materials are mixed, heated, and kneaded. The liquid material after the kneading step is injected and fed at high pressure into a die of an injection molding machine, and cooled and solidified. When the formed light-scattering light guide is taken out of the die, a light-scattering light guide in a shape corresponding to the mold shape is obtained.

The kneaded two or more types of polymers differing in refractive index are solidified without being mixed completely. Local concentration unevenness (fluctuation) is formed and fixed, and a uniform scattering power is obtained.

To obtain a desired forming, a kneaded material may be poured into a cylinder of an extrusion forming machine, and may be extruded in an ordinary method.

The combination and mixing rate of the polymer blend are selectable in a very wide range. They are preferably determined in consideration of the refractive index difference, and strength and property of the refractive index nonuniform structure formed in the forming process (scattering irradiation parameter E, correlation distance a, dielectric constant fluctuation square mean $\tau$, etc.). Typical examples usable as polymer material are listed in Table 1 and Table 2.

In other manufacturing method of the material for composing the light-scattering light guide, granular materials differing in the refractive index are uniformly mixed and dispersed in the polymer material. The required minimum difference in refractive index between the polymer material and the granular material is 0.001.

For uniform mixing of the granular material, a suspension polymerization method may be employed. According to this method, the granular material is mixed in the monomer, and polymerization reaction is executed in a state of being suspended in a molted material. By forming this material, a light-scattering light guide of a desired shape is manufactured.

By executing suspension polymerization in various combinations of granular material and monomer combination of particle concentration, particle size, refractive index, etc.), preparing plural types of materials, and blending and forming them selectively, light-scattering light guides of various characteristics can be manufactured. To control the particle concentration, a polymer not containing granular material may be also blended.

According to a different method applicable to uniform mixing of granular material, the polymer material and granular material are kneaded. In this case, too, by kneading and forming (pelletizing) in various combinations of granular material and polymer (combination of particle concentration, particle size, refractive index. etc.), and blending them selectively, light-scattering light guides may be formed and manufactured. As a result, light-scattering light guides of various characteristics may be obtained.

It is also possible to combine the polymer blending method and granular material mixing method. For example, a granular material may be mixed in while blending and kneading polymers differing in refractive index.

Some of manufacturing examples are given below.

Manufacturing Example 1

To methacrylic resin pellets (DELVET 80N; Asahi Chemical Industry Co., Ltd. ), silicone resin powder (TOSPEARL 108; Toshiba Silicone Co., Ltd.) of particle size 0.8 μm was added by 0.3 wt. %, and mixed and dispersed by a mixer. The mixture was extruded in a stand by an extrusion machine, and pelletized by a pelletizer, and pellets uniformly dispersing silicone resin powder were prepared.

Using an injection forming machine, the pellets were formed in the conditions of cylinder temperature 230° C. to 260° C. and die temperature 50° C., and a light-scattering light guide in a plate form of 80 mm in length and width and 5 mm in thickness was obtained.

The correlation distance of the manufactured light-scattering light guide was a=0.53 μm, and an estimate calculation value by formula (11) of the effective scattering irradiation parameter was E=12.6[cm$^{-1}$].

Manufacturing Example 2

To MMA, silicone resin powder (TOSPEARL 108; Toshiba Silicone Co., Ltd. ) of particle size 0.8 μm was added by 0.3 wt. %, and spherical granules uniformly dispersing the powder were obtained by a known suspension polymerization method. By pelletizing them by the pelletizer in the same manner as Manufacturing Example 1, pellets uniformly dispersing the silicone resin powder were prepared.

Thereafter, in the same conditions as in Manufacturing Example 1, a light-scattering light guide of same shape and same dimensions was obtained. This light-scattering light guide was not distinguishable at all in appearance from the light-scattering light guide fabricated in Manufacturing Example 1. The correlation distance was a=0.53 μm, and an estimate calculation value by formula (11) of the effective scattering irradiation parameter was E=12.6[cm$^{-1}$].

Manufacturing Example 3

To polymethyl methacrylate (PMMA), polystyrene (PSt) was added by 0.5 wt. %, and mixed for 10 minutes by using a V-tumbler and then 5 minutes by a mixer. Using a twin shaft extrusion machine of 30 mm in diameter, pellets were formed by melting and mixing them in the conditions of cylinder temperature 220° C. to 250° C., screw rotating speed 75 rpm, and discharge rate 6 kg/hr.

The pellets were formed in an extrusion forming machine in the conditions of cylinder temperature 220° C. to 250° C., die temperature 65° C., medium injection speed, and injection pressure short shot pressure plus 10 kg/cm², and a light-scattering light guide of the same shape and same dimensions as in Manufacturing Example 1 was obtained.

Manufacturing Example 4

To MMA (methyl methacrylate), silicone resin powder (TOSPEARL 120; Toshiba Silicone Co., Ltd.) of particle size 2 μm was added by 0.05 wt. %, 0.08 wt. %, 0.10 wt. %, and 0.15 wt. %, and dispersed uniformly, and four types of samples and MMA sample without particles were prepared. In each one of these five samples, benzoyl peroxide (BPO) was added by 0.5 wt. % as radical polymerization initiator, and n-lauryl mercaptan (n-LM) by 0.2 wt. % as chain-transfer agent, and by casting polymerization for 24 hours at 70° C., each piece of light-scattering light guide in the same shape and same dimensions as in Manufacturing Example 1 was fabricated Manufacturing Example 5

To MMA (methyl methacrylate), silicone oil was added by 0.025 wt. % add dispersed uniformly, and benzoyl peroxide (BPO) was added by 0.5 wt. % as radical polymerization initiator, and n-butyl mercaptan (n-BM) by 0.2 wt. % as chain-transfer agent, and sol formation was conducted for 30 minutes at 70° C. By casting polymerization for 24 hours at 65° C., a light-scattering light guide in the same shape and same dimensions as in Manufacturing Example 1 was fabricated.

Manufacturing Example 6

To PMMA (polymethyl methacrylate), silicone resin powder (TOSPEARL 120; Toshiba Silicone Co., Ltd.) of particle size 2 μm was added by 0.08 wt. %, and mixed for 10 minutes by using a V-tumbler and then 5 minutes by using a mixer. The mixture was melted and mixed by twin shaft extrusion machine (cylinder temperature 220° C. to 250° C.), extruded and formed, and pellets were prepared.

The pellets were injected and formed by using an injection forming machine in the conditions of cylinder temperature of 220° C. to 250° C., and a light-scattering light guide in same shape and same dimensions as in Manufacturing Example 1 was fabricated.

In these manufacturing examples, by changing the shape and dimensions of the die, light-scattering light guides in a plate form having desired dimensions and shape can be manufactured.

As described herein, the invention presents a corner supply type plane light source device which is simple in structure, easy in assembly, restricted in the return light, capable of forming a uniform luminescent part by a small power consumption. Also according to the invention, if a light source of high directivity such as LED is used, uniformity of a sufficient brightness is realized by disposing the individual elements at corners of the light-scattering light guide, without being restricted by the array configuration.

What is claimed is:

1. A corner supply type plane light source device comprising a light-scattering light guide of a flat plate form including a volume region having a uniform scattering power, and light supply means for supplying light from a corner or corners of the light-scattering light guide, wherein the value of effective scattering irradiation parameter $E[cm^{-1}]$ defining the light scattering power of the light-scattering light guide is in a range of $9[cm^{-1}] \leq E \leq 100[cm^{-1}]$, and the value of correlation distance $a[\mu m]$ in the correlation function $\gamma(r)$ of non-uniform refractive index structure for producing light scattering power approximated by $\gamma(r)=\exp[-r/a]$ (where r is the distance between two points in the light-scattering light guide) is in a range of $0.06[\mu m] \leq a \leq 35[\mu m]$.

2. A corner supply type plane light source device of claim 1, wherein a light incident surface of an oblique straight cut plane is formed at one or plural corners of the light-scattering light guide receiving supply of light from the light supply means.

3. A corner supply type plane light source device of claim 1, wherein alight incident surface of a recess shaped cut plane is formed at one or plural corners of the light-scattering light guide receiving supply of light from the light supply means.

4. A corner supply type plane light source device comprising a light-scattering light guide of a flat plate form including a volume region having a uniform scattering power, and at least one light-emitting diode for supplying light from a corner of the light-scattering light guide, wherein the value of effective scattering irradiation parameter $E[cm^{-1}]$ defining the light scattering power of the light-scattering light guide is in a range of $9[cm^{-1}] \leq E \leq 100[cm^{-1}]$, and the value of correlation distance $a[\mu m]$ of approximating the correlation function $\gamma(r)$ of non-uniform refractive index structure for producing light scattering power approximated by $\gamma(r)=\exp[-r/a]$ (where r is the distance between two points in the light-scattering light guide) is in a range of $0.06[\mu m] \leq a \leq 35[\mu m]$.

5. A corner supply type plane light source device of claim 4, wherein a light incident surface of an oblique straight cut plane is formed at one or plural corners of the light-scattering light guide receiving supply of light from said at least one light-emitting diode.

6. A corner supply type plane light source device of claim 4, wherein a light incident surface of a recess shaped cut plane is formed at one or plural corners of the light-scattering light guide receiving supply of light from said at least one light-emitting diode.

* * * * *

UNITED STATES PATENT AND TRADEMARK OFFICE
CERTIFICATE OF CORRECTION

PATENT NO. : 5,528,709
DATED : June 18, 1996
INVENTOR(S) : Yasuhiro KOIKE

It is certified that error appears in the above-indentified patent and that said Letters Patent is hereby corrected as shown below:

Under Prior Foreign Applications, please list the following

--6-133960    05/1994    Japan--.

Column 9, Table 2, line 22, change "PVAC" to --$PVA_c$--;
line 23, change "PVCIAC" to --$PVCIA_c$--; and
line 28, change "(P-FSt) to --(p-FSt)--.

Column 10, line, 49, change "Example" to --example--;
line 53, change "Example" to --example--; and
line 57, change "Example" to --example--.

Column 11, line 6, change "Example" to --example--;
line 18, change "Example" to --example--;
line 29, change "Example" to --example--;
line 42, change "Example" to --example--.

Signed and Sealed this

Twenty-fourth Day of September, 1996

Attest:

BRUCE LEHMAN

Attesting Officer        Commissioner of Patents and Trademarks